(12) United States Patent
Liu et al.

(10) Patent No.: US 11,422,305 B2
(45) Date of Patent: Aug. 23, 2022

(54) STRUCTURES FOR FILTERING LIGHT POLARIZATION STATES ON A PHOTONICS CHIP

(71) Applicant: GLOBALFOUNDRIES U.S. Inc., Santa Clara, CA (US)

(72) Inventors: Yangyang Liu, Glendora, CA (US); Tymon Barwicz, Holmdel, NJ (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/109,559

(22) Filed: Dec. 2, 2020

(65) Prior Publication Data

US 2022/0171126 A1 Jun. 2, 2022

(51) Int. Cl.
*G02B 6/125* (2006.01)
*G02B 6/13* (2006.01)
*G02B 6/126* (2006.01)

(52) U.S. Cl.
CPC .............. *G02B 6/125* (2013.01); *G02B 6/126* (2013.01); *G02B 6/13* (2013.01)

(58) Field of Classification Search
CPC ....................................................... G02B 6/125
See application file for complete search history.

(56) References Cited

U.S. PATENT DOCUMENTS

| | | | | |
|---|---|---|---|---|
| 5,178,728 | A * | 1/1993 | Boysel | G02B 6/122 216/13 |
| 6,411,765 | B1 * | 6/2002 | Ono | G02B 6/12002 385/39 |
| 7,200,303 | B2 * | 4/2007 | Feuer | G02B 6/12 359/333 |
| 11,092,740 | B1 * | 8/2021 | Bian | G02B 5/3066 |
| 2004/0120676 | A1 * | 6/2004 | Lee | G02B 6/125 385/129 |
| 2014/0233881 | A1 * | 8/2014 | Hatori | G02B 6/1228 385/14 |
| 2017/0163000 | A1 * | 6/2017 | Evans | H01S 5/06256 |
| 2019/0164714 | A1 * | 5/2019 | Durand | H01J 25/36 |

(Continued)

OTHER PUBLICATIONS

W. D. Sacher, B. Peng, J. C. Rosenberg, M. Khater, Y. Martin, J. S. Orcutt, Y. A. Vlasov, W. M. J. Green, and T. Barwicz, "An O-band Polarization Splitter-Rotator in a CMOS-Integrated Silicon Photonics Platform," in Frontiers in Optics 2016, OSA Technical Digest (online) (Optical Society of America, 2016), paper FTu2D.2.

(Continued)

*Primary Examiner* — Eric Wong
(74) *Attorney, Agent, or Firm* — Thompson Hine LLP; Anthony Canale

(57) ABSTRACT

Structures for polarization filtering and methods of forming a structure for polarization filtering. A waveguiding structure has a first waveguide core region including a first plurality of bends, a second waveguide core region including a second plurality of bends laterally spaced from the first plurality of bends by a gap, and a third waveguide core region including a third plurality of bends positioned beneath the gap. The first waveguide core region and the second waveguide core region contain a first material. The third waveguide core region contains a second material that differs in composition from the first material.

20 Claims, 6 Drawing Sheets

(56) References Cited

U.S. PATENT DOCUMENTS

| | | | |
|---|---|---|---|
| 2019/0250329 A1* | 8/2019 | Melikyan | G02B 6/14 |
| 2020/0073051 A1* | 3/2020 | Baudot | G02B 6/122 |
| 2020/0393617 A1* | 12/2020 | Bian | G02B 6/136 |
| 2021/0003388 A1* | 1/2021 | Shepherd | G02B 6/1221 |
| 2021/0116638 A1* | 4/2021 | Bian | G02B 6/125 |

OTHER PUBLICATIONS

Wesley D. Sacher, Ying Huang, Liang Ding, Tymon Barwicz, Jared C. Mikkelsen, Benjamin J. F. Taylor, Guo-Qiang Lo, and Joyce K. S. Poon, "Polarization rotator-splitters and controllers in a Si3N4-on-SOI integrated photonics platform," Opt. Express 22, 11167-11174 (2014).

Long Chen, Christopher R. Doerr, and Young-Kai Chen, "Compact polarization rotator on silicon for polarization-diversified circuits," Opt. Lett. 36, 469-471 (2011).

Denis Gagnon, Joey Dumont, Jean-Luc Dziel, and Louis J. Dubé, "Optimization of integrated polarization filters," Opt. Lett. 39, 5768-5771 (2014).

\* cited by examiner

STRUCTURES FOR FILTERING LIGHT POLARIZATION STATES ON A PHOTONICS CHIP

BACKGROUND

The present invention relates to photonics chips and, more specifically, to structures for polarization filtering and methods of forming a structure for polarization filtering.

Photonics chips are used in many applications and systems such as data communication systems and data computation systems. A photonics chip integrates optical components, such as waveguides, optical switches, and polarization filters, and electronic components, such as field-effect transistors, into a unified platform. Layout area, cost, and operational overhead, among other factors, may be reduced by the integration of both types of components into a common chip.

Polarization filters are a type of optical component commonly found in photonics chips. A polarization filter is configured to receive an optical signal containing multiple polarization modes and to selectively allow only a single polarization mode to propagate while the other polarization mode is eliminated. Polarization filters are available that attenuate the transverse magnetic polarization while passing the transverse electric polarization. However, polarization filters that attenuate the transverse electric polarization while passing the transverse magnetic polarization present technological challenges.

Improved structures for polarization filtering and methods of forming a structure for polarization filtering are needed.

SUMMARY

In an embodiment of the invention, a structure includes a waveguiding structure having a first waveguide core region including a first plurality of bends, a second waveguide core region including a second plurality of bends laterally spaced from the first plurality of bends by a gap, and a third waveguide core region including a third plurality of bends positioned beneath the gap. The first waveguide core region and the second waveguide core region are comprised of a first material. The third waveguide core region is comprised of a second material that differs in composition from the first material.

In an embodiment of the invention, a method of forming a waveguiding structure is provided. The method includes forming a first waveguide core region including a first plurality of bends, forming a second waveguide core region including a second plurality of bends that are laterally spaced from the first plurality of bends by a gap, and forming a third waveguide core region including a third plurality of bends positioned beneath the gap. The first waveguide core region and the second waveguide core region are comprised of a first material, and the third waveguide core region is comprised of a second material that differs in composition from the first material.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
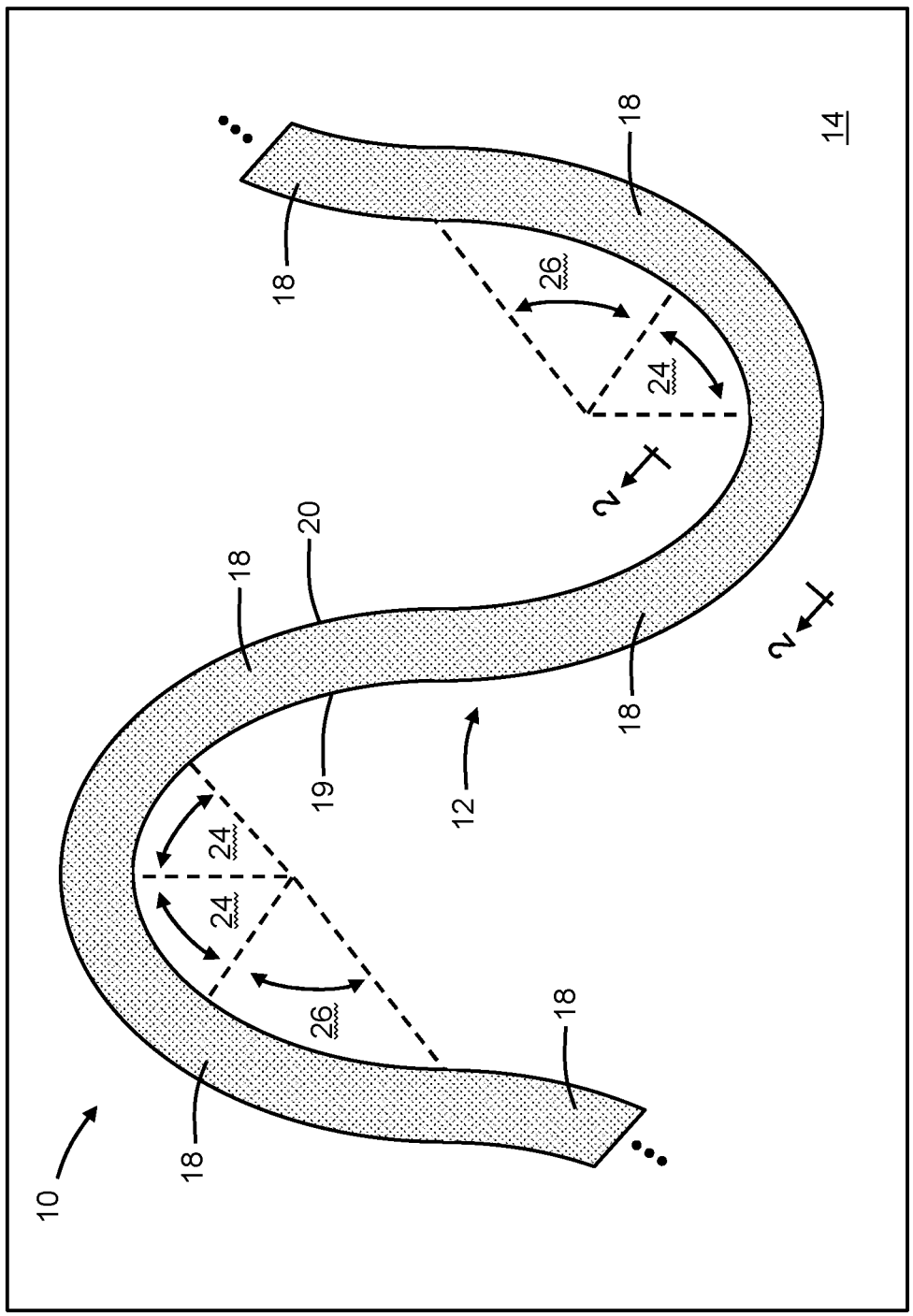
FIG. 1 is a top view of a structure for a polarization splitter at an initial fabrication stage of a processing method in accordance with embodiments of the invention.
Figure 2:
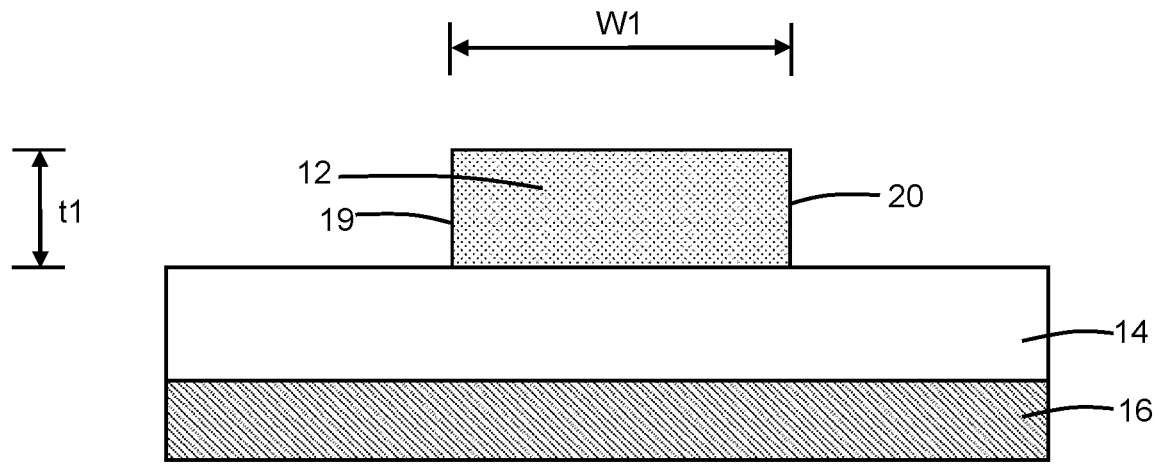
FIG. 2 is a cross-sectional view taken generally along line 2-2 in FIG. 1.

With reference to FIGS. 1, 2 and in accordance with embodiments of the invention, a structure 10 for a polarization splitting device includes a waveguide core region 12 that is positioned over a dielectric layer 14. The waveguide core region 12 may be comprised of a high refractive-index material. In an embodiment, the waveguide core region 12 may be comprised of a material having a refractive index in a range of 3 to 4. In an embodiment, the waveguide core region 12 may be comprised of a single-crystal semiconductor material, such as single-crystal silicon patterned by lithography and etching processes from a device layer of a silicon-on-insulator (SOI) substrate. The silicon-on-insulator substrate further includes a buried insulator layer comprised of a dielectric material, such as silicon dioxide, that provides the dielectric layer 14 and a handle substrate 16 comprised of a single-crystal semiconductor material, such as single-crystal silicon, under the buried insulator layer.

The waveguide core region 12 may be rectangular or substantially rectangular in cross-sectional area with opposite side surfaces or sidewalls 19, 20. The waveguide core region 12 may have a thickness, t1, that ranges, for example, from about 130 nanometers (nm) to about 220 nm. The waveguide core region 12 has a width, W1, over its length. In an embodiment, the width, W1, may range from about 100 nm to about 170 nm. In an embodiment, the width, W1, may range from about 130 nm to about 150 nm.

The waveguide core region 12 includes bends 18 that are adjoined and connected in a continuous manner along a curved longitudinal axis that changes in direction with the changing curvature of the bends 18. Each bend 18 may include a section 24 and a section 26 that has a different curvature than the section 24. The bends 18 of the waveguide core region 12 may be arranged along the longitudinal axis such that the sections 24 of adjacent bends 18 are connected and that the sections 26 of adjacent bends 18 are connected. Each section 24 is shaped as a sector of an annulus over which the sidewalls 19, 20 are circularly curved over a given arc length. In an embodiment, the arc length of the annulus sector may be equal to 45°. The sections 26 have a shape that is curved differently than the shape of the sections 24 and may provide gradual curvature transitions.

In an embodiment, the bends 18 may be adiabatic bends in which the curvature changes continuously without abrupt curvature changes that could negatively impact the optical performance of the structure 10. For example, each transition between adjacent connected sections 26 may have a gradual curvature reversal to avoid abrupt junctions that could result in unwanted polarization mixing. In an embodiment, the transitions between the adjacent connected sections 26 may feature a graded curvature transition that provides the gradual curvature reversal.

The bends 18 are coupled at one end to a routing waveguide core 54 that provides an input port to the structure 10. Similarly, the bends 18 are coupled at an opposite end back to the routing waveguide core 54, which also provides an output port from the structure 10.

Figure 4:
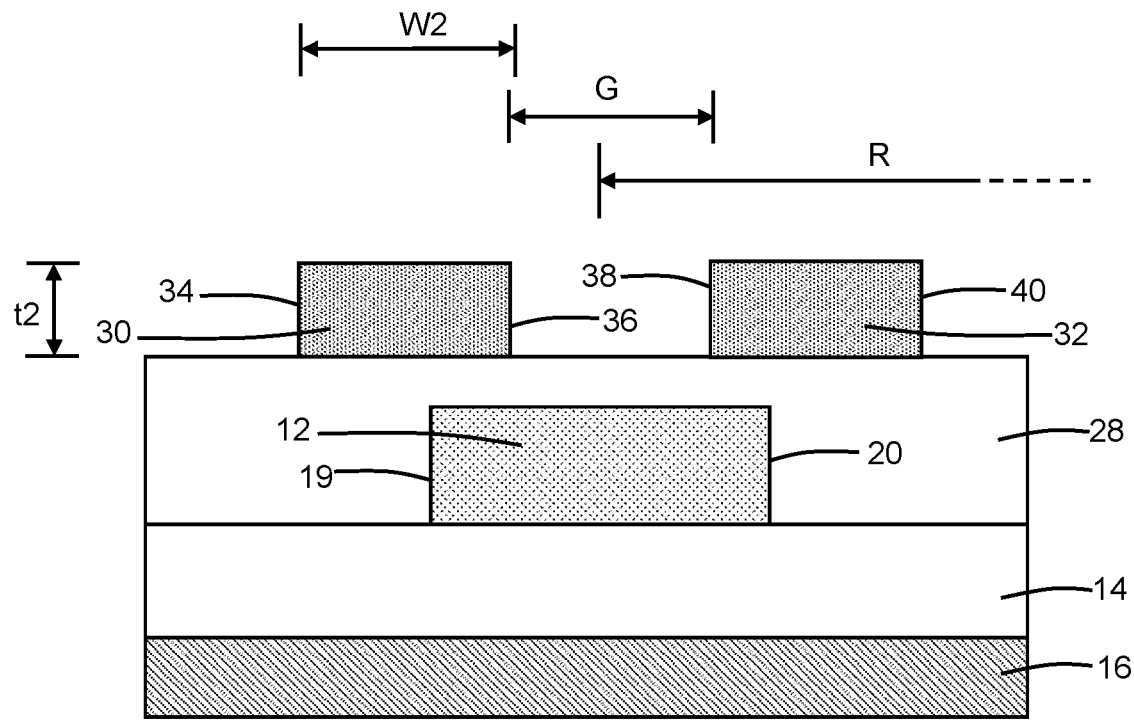
FIG. 4 is a cross-sectional view taken generally along line 4-4 in FIG. 3.
Figure 3:
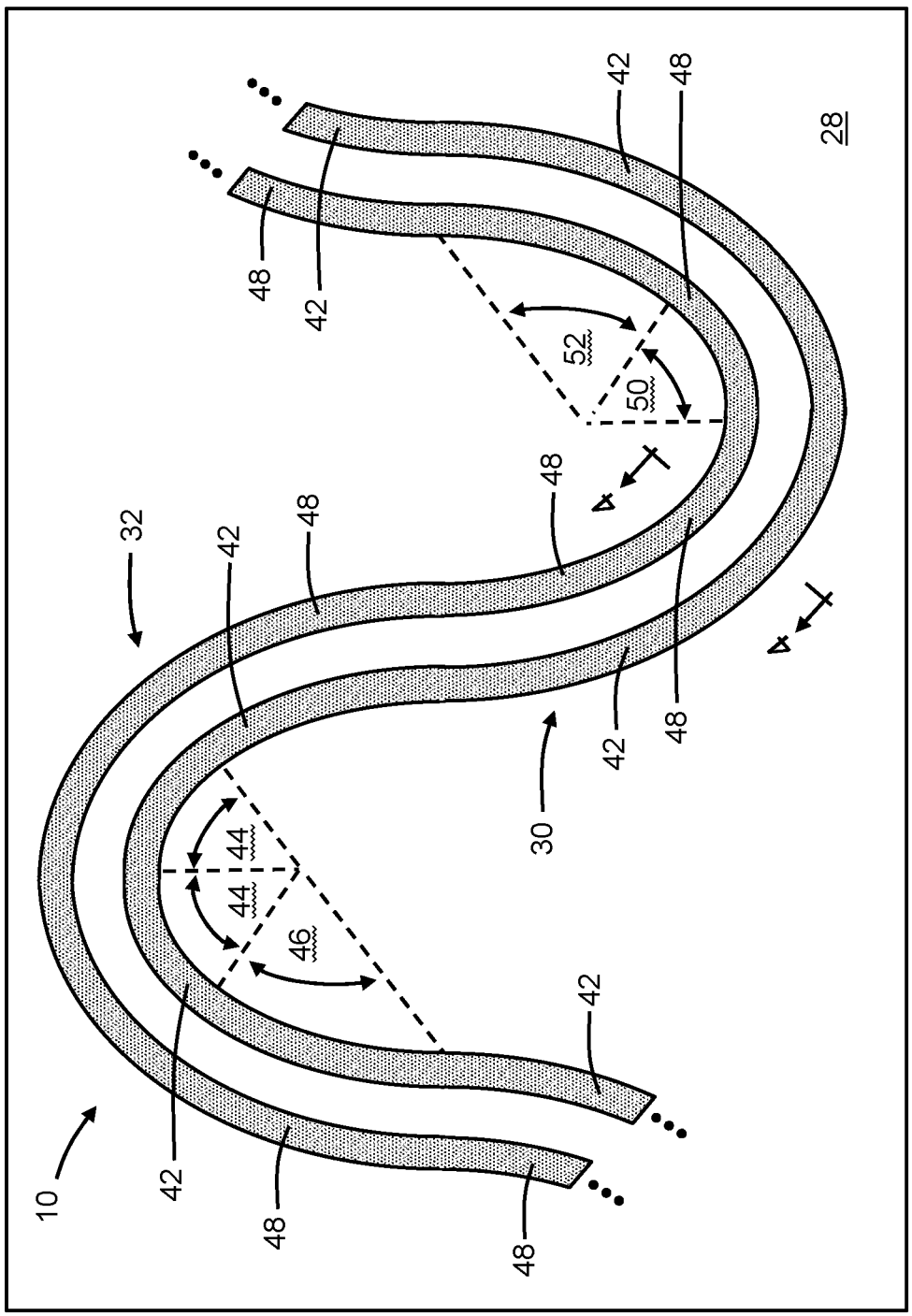
FIG. 3 is a top view of the structure at a fabrication stage subsequent to FIG. 1.

With reference to FIGS. 3, 4 in which like reference numerals refer to like features in FIGS. 1, 2 and at a subsequent fabrication stage, one or more dielectric layers 28 are formed over the waveguide core region 12. In an embodiment, the one or more dielectric layers 28 may have a refractive index in a range of 1.3 to 1.6. In an embodiment, the one or more dielectric layers 28 may have a refractive index in a range of 1.4 to 1.5. In an embodiment, the one or more dielectric layers 28 may be comprised of, for example, as silicon dioxide, deposited by chemical vapor deposition. The waveguide core region 12 is embedded in the dielectric material of the one or more dielectric layers 28, which operate as low-index cladding.

A waveguide core region 30 and a waveguide core region 32 may be formed over the one or more dielectric layers 28. The waveguide core regions 30, 32 may be formed by depositing a layer of their constituent material over the one or more dielectric layers 28 and patterning the deposited layer with lithography and etching processes. The waveguide core regions 30, 32 contain a material having a different composition than the material of the waveguide core region 12. In an embodiment, the waveguide core regions 30, 32 may be comprised of a material having a refractive index in a range of 1.7 to 4. In an embodiment, the waveguide core regions 30, 32 may be comprised of a material having a refractive index in a range of 1.7 to 2.4. In an embodiment, the waveguide core regions 30, 32 may be comprised of a dielectric material, such as silicon nitride.

The waveguide core region 30 may be rectangular or substantially rectangular in cross-sectional area, and the waveguide core region 30 may have opposite side surfaces or sidewalls 34, 36. The waveguide core region 32 may likewise be rectangular or substantially rectangular in cross-sectional area, and the waveguide core region 32 may have opposite side surfaces or sidewalls 38, 40. The waveguide core regions 30, 32 each have a thickness, t2, that may range from about 130 nm to about 400 nm. In an alternative embodiment, the thickness, t2, may range from about 220 nm to about 400 nm. The waveguide core regions 30, 32 have a width, W2, over their respective lengths. In an embodiment, the width, W2, may range from about 100 nm to about 220 nm. In an alternative embodiment, the width, W1, may range from about 160 nm to about 200 nm. In an embodiment, the thickness of the dielectric material of the one or more dielectric layers 28 between the waveguide core region 12 and the waveguide core regions 30, 32 may be less than or equal to 200 nm. In an alternative embodiment, the thickness of the dielectric material of the one or more dielectric layers 28 between the waveguide core region 12 and the waveguide core regions 30, 32 may be less than or equal to 100 nm.

The waveguide core region 30 includes bends 42 that are adjoined and connected in a continuous manner along a longitudinal axis that changes in direction with the changing curvature of the bends 42. Each bend 42 may include a section 44 and a section 46 that has a different curvature than the section 44. The bends 42 may be arranged such that the sections 44 of adjacent bends 42 are connected and that the sections 46 of adjacent bends 42 are connected. Each section 44 is shaped as a sector of an annulus over which the sidewalls 34, 36 are circularly curved over a given arc length. In an embodiment, the arc length of the annulus sector may be equal to 45°. The sections 46 have a shape that is curved differently than the shape of the sections 44 and may provide gradual curvature transitions.

In an embodiment, the bends 42 may be adiabatic bends in which the curvature changes continuously without abrupt curvature changes that could negatively impact the optical performance of the structure 10. For example, each transition between adjacent connected sections 46 may have a gradual curvature reversal to avoid abrupt junctions that could result in unwanted polarization mixing. In an embodiment, the transitions between the adjacent connected sections 46 may feature a graded curvature transition that provides the gradual curvature reversal.

The waveguide core region 32 includes bends 48 that are adjoined and connected in a continuous manner along a longitudinal axis that changes in direction with the changing curvature of the bends 48. Each bend 48 may include a section 50 and a section 52 that has a different curvature than the section 50. The bends 48 may be arranged such that the sections 50 of adjacent bends 48 are connected and that the sections 52 of adjacent bends 48 are connected. Each section 50 is shaped as a sector of an annulus over which the sidewalls 34, 36 are circularly curved over a given arc length. In an embodiment, the arc length of the annulus sector may be equal to 45°. The sections 52 have a shape that is curved differently than the shape of the sections 50 and may provide gradual curvature transitions.

In an embodiment, the bends 48 may be adiabatic bends in which the curvature changes continuously without abrupt curvature changes that could negatively impact the optical performance of the structure 10. For example, each transition between adjacent connected sections 52 may have a gradual curvature reversal to avoid abrupt junctions that could result in unwanted polarization mixing. In an embodiment, the transitions between the adjacent connected sections 52 may feature a graded curvature transition that provides the gradual curvature reversal.

The bends 42 of the waveguide core region 30 may be substantially concentric with the bends 48 of the waveguide core region 32 with the bends 42 laterally spaced from the bends 48. Consequently, the sidewall 36 of the waveguide core region 30 is positioned adjacent to the sidewall 38 of the waveguide core region 32 in a spaced relationship. In particular, the sidewall 36 is spaced from the sidewall 38 by a gap, G. The size of the gap, G, between the bends 42 of the waveguide core region 30 and the bends 48 of the waveguide core region 32 may be constant or substantially constant. In an embodiment, the size of the gap, G, may range from about 100 nm to about 200 nm. In an alternative embodiment, the size of the gap, G, may range from about 100 nm to about 140 nm. The bend radius, R, for the sections 24 of bends 18, the sections 44 of bends 42, and the sections 50 of the bends 48 to the center of the gap, G, may be in a range of 5 microns to 100 microns and, in an embodiment, may reflect a constant curvature. In an alternative embodiment, the bend radius, R, for the sections 24 of bends 18, the sections 44 of bends 42, and the sections 50 of the bends 48 may be in the range of about 30 microns to about 50 microns.

The bends 18, bends 42, and bends 48 may have equal or substantially equal curvatures. The bends 42, 48 of the waveguide core regions 30, 32 may be gradually curved in such a way as to be substantially concentric with the bends 18 of the waveguide core region 12. In an embodiment, the bends 18, bends 42, and bends 48 may be substantially concentric at all local curvature points.

The waveguide core regions 30, 32 may be positioned above and over the waveguide core region 12 with the waveguide core region 12 positioned beneath the gap, G. In an embodiment, a portion of the waveguide core region 12 may be positioned directly below and under the gap, G, at a location between the waveguide core regions 30, 32. In an embodiment, the waveguide core region 12 may be centered directly below and under the gap, G, at a location between the waveguide core regions 30, 32. In an embodiment, the waveguide core region 12 may be centered directly below and under the gap, G, between the waveguide core regions 30, 32 and equal portions of the waveguide core region 12 may be located beneath each of the waveguide core regions 30, 32.

The waveguide core regions 30, 32 are located in a different level or horizontal plane within the structure 10 than the waveguide core region 12. A portion of the waveguide core region 30 may overlap with the waveguide core region 12 and another portion of the waveguide core region 30 may lack an overlap with the waveguide core region 12. A portion of the waveguide core region 32 may overlap with the waveguide core region 12, and another portion of the waveguide core region 32 may lack an overlap with the waveguide core region 12. The overlapping portions of the waveguide core regions 30, 32 are positioned adjacent to the gap, G.

Figure 8:
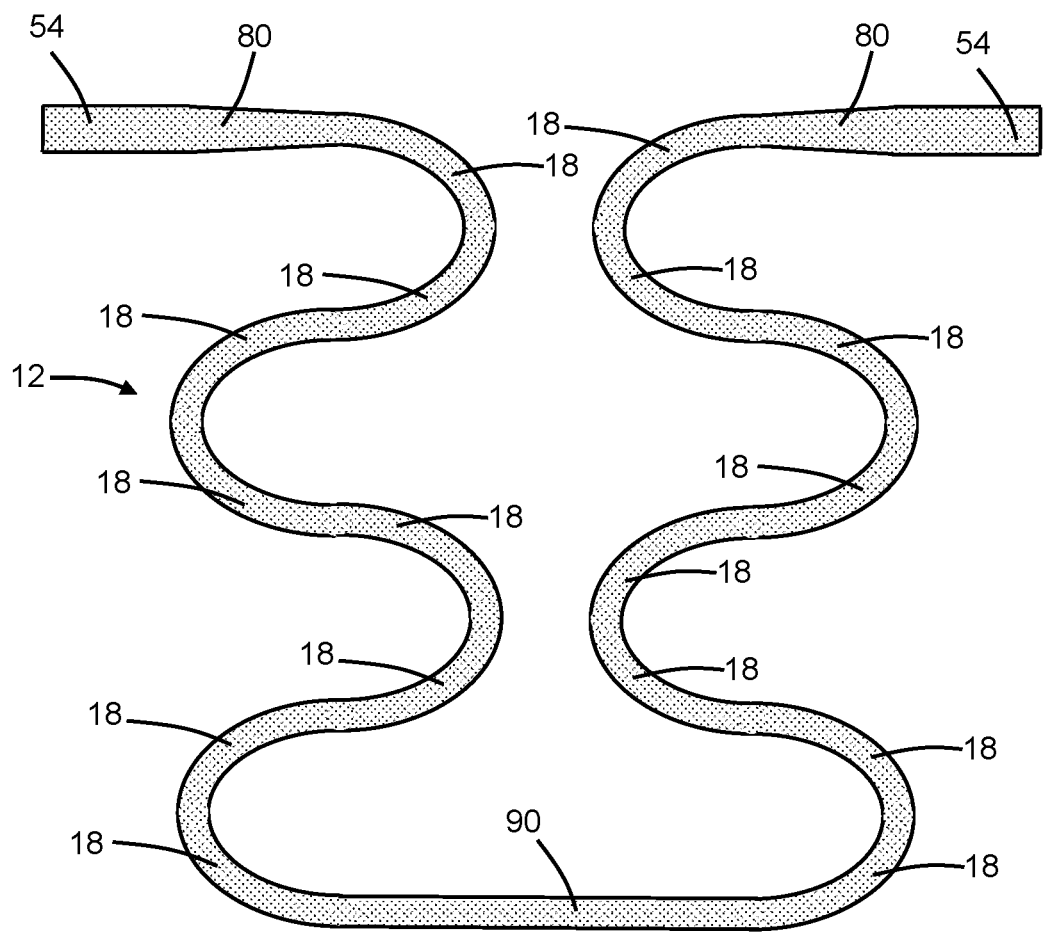
FIG. 8 is a top view of a structure in accordance with embodiments of the invention.

The number of bends 18, 42, 48 in the structure 10 and the curvature of the bends 18, 42, 48 may vary contingent upon, among other factors, the desired degree of filtering of light of one polarization state (e.g., the transverse electric (TE) mode) from mixed-polarization light containing multiple polarization states (e.g., the TE mode and the transverse magnetic (TM) mode). Increasing the number of bends 18, 42, 48 may increase the removal of the filtered polarization state by the structure 10. For example, the bends 18, 42, 48 may be replicated and connected end-to-end (as diagrammatically indicated by the dotted lines in FIG. 1 and FIG. 3, and as shown in FIG. 8) such that multiple sets of bends 18, 42, 48 are cascaded to achieve a desired filtering performance from the structure 10.

Figure 5:
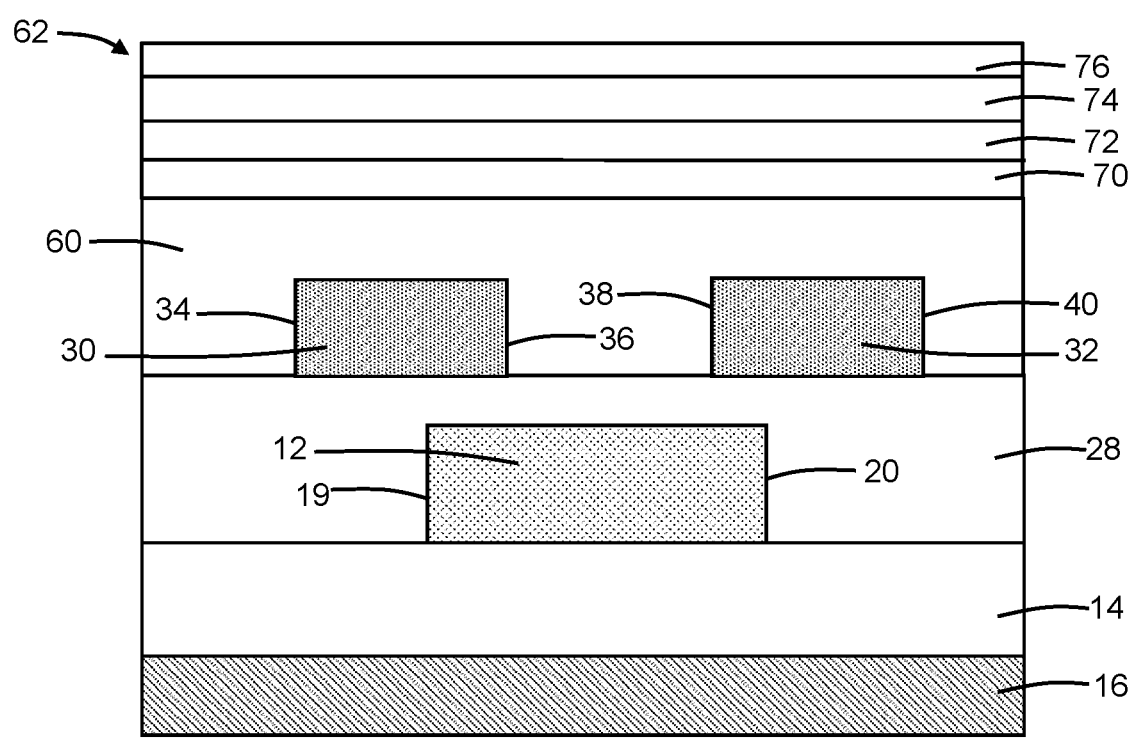
FIG. 5 is a cross-sectional view of the structure at a fabrication stage subsequent to FIG. 4.

With reference to FIG. 5 in which like reference numerals refer to like features in FIG. 4 and at a subsequent fabrication stage, a dielectric layer 60 is formed over the waveguide core regions 30, 32. The dielectric layer 60 may be comprised of a dielectric material, such as silicon dioxide, deposited by chemical vapor deposition and planarized by, for example, chemical-mechanical polishing to remove topography. The thickness of the dielectric layer 60 may be greater than the thickness of the waveguide core regions 30, 32 such that the waveguide core regions 30, 32 are embedded in the dielectric material of the dielectric layer 60. In an embodiment, the thickness of the dielectric layer 60 may range from about 260 nm to about 760 nm.

A back-end-of-line stack 62 may be formed over the dielectric layer 60. The back-end-of-line stack 62 includes dielectric layers 70, 72, 74, 76 that may be comprised of dielectric materials of alternating composition. In an embodiment, the dielectric layers 70, 74 may be comprised of a low-k dielectric material having a refractive index between 1.2 and 1.44, the dielectric layers 72, 76 may be comprised of a nitrogen-containing blocking dielectric material having a refractive index between 1.7 and 2.8, the layers 70, 74 may each have a thickness in a range of about 20 nm to about 3000 nm, and the layers 72, 76 may each have a thickness in a range of about 5 nm to about 1000 nm. In an embodiment, the dielectric layers 70, 74 may be comprised of a nitrogen-containing blocking dielectric material having a refractive index between 1.7 and 2.8, the dielectric layers 72, 76 may be comprised of a low-k dielectric material having a refractive index between 1.2 and 1.44, the layers 70, 74 may each have a thickness in a range of about 5 nm to about 1000 nm, and the layers 72, 76 may each have a thickness in a range of about 20 nm to about 3000 nm.

The waveguide core region 12 contains a material having a different composition than the material contained by the waveguide core regions 30, 32 and, therefore, a material having a different refractive index than the material contained by the waveguide core regions 30, 32. In an embodiment, the refractive index of the waveguide core regions 30, 32 may be less than the refractive index of the waveguide core region 12. In an embodiment, the difference in the refractive index of the material of the waveguide core region 12 and the refractive index of the material of the waveguide core regions 30, 32 may be greater than or equal to twenty-five (25) percent. In an embodiment, the difference in the refractive index of the materials of the waveguide core regions 12, 30, 32 and one or more of the cladding materials (e.g., the dielectric layer 14, and dielectric layers 70, 72, 74, 76) may be greater than or equal to twenty-five (25) percent.

The structure 10, in any of its embodiments described herein, may be integrated into a photonics chip that includes electronic components and additional optical components. For example, the electronic components may include field-effect transistors that are fabricated by complementary metal-oxide-semiconductor (CMOS) processing.

In use, photonic or optical signals including laser light with multiple polarization states of substantially orthogonal polarizations, such as the fundamental transverse electric (TE0) mode and the fundamental transverse magnetic (TM0) mode, may be guided to the structure 10 by a section of the routing waveguide core 54. For example, the optical signals may include laser light characterized by a nominal peak wavelength in the infrared band of the electromagnetic spectrum, such as a nominal peak wavelength in vacuum of 1310 nm or 1550 nm. The structure 10 preferentially removes one of the polarization states, such as the TE0 mode, of the light from the waveguide core region 12 by radiation into the surrounding cladding materials. The other polarization state of the light (e.g., the TM0 mode) exits the bends 18, 42, 48 and is guided away from the structure 10 by another section of the routing waveguide core 54.

In embodiments, the structure 10 may increase the confinement of the TM mode while limiting the confinement increase on the TE mode in comparison with conventional polarization filters. The structure 10 may thereby reverse the confinement contrast between TE and TM modes and enable the filter to radiate the TE mode while preserving the TM mode. The structure 10 may improve cross-talk by reducing mixing between the different polarizations and may have a smaller footprint than conventional polarization filters.

Figure 6:
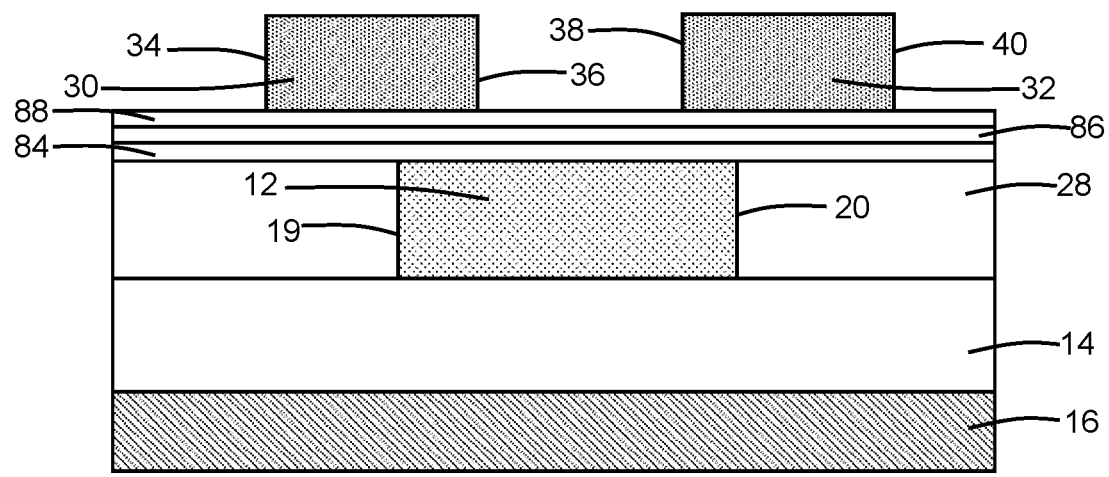
FIG. 6 is a cross-sectional view of a structure in accordance with embodiments of the invention.

With reference to FIG. 6 and in accordance with alternative embodiments of the invention, additional dielectric layers 84, 86, 88 may be formed between the waveguide core region 12 and the waveguide core regions 30, 32 instead of being occupied by a homogenous dielectric material. The dielectric layers 84, 86, 88 may constitute slab layers that are not patterned in the vicinity of the structure 10. In an embodiment, the dielectric layer 84 and the dielectric layer 88 may be comprised of silicon dioxide, and the dielectric layer 86 may be comprised of silicon nitride. In an embodiment, the thickness of each of the unpatterned dielectric layers 84, 86, 88 may range from about 1 nanometer to about 100 nanometers.

Figure 7:
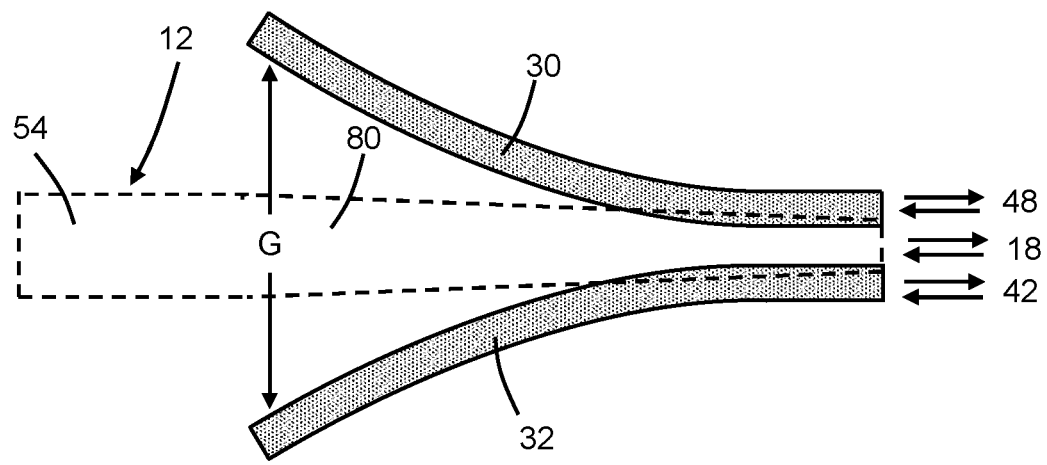
FIG. 7 is a top view of a structure in accordance with embodiments of the invention.

With reference to FIG. 7 and in accordance with alternative embodiments of the invention, the bends 18 of the waveguide core region 12 are coupled at opposite ends to different sections of the routing waveguide core 54. Each section of the routing waveguide core 54 may be connected to a taper 80 of the waveguide core region 12, and the taper 80 provides a width reduction from the width of the routing waveguide core 54 to the width of the bends 18. In embodiments, the width at the intersection of the routing waveguide core 54 and the taper 80 may be in a range of about 320 nanometers to about 400 nanometers or, alternatively, in a range of about 340 nanometers to about 60 nanometers. The waveguide core regions 30, 32 diverge laterally away from the taper 80 to provide increase the size of the gap, G, such that optical coupling is lessened or prevented. In one embodiment, G is in the range of about 1 micron to about 5 microns. In an embodiment, the length of taper 80 is between about 1 micron and about 300 microns.

With reference to FIG. 8 and in accordance with alternative embodiments of the invention, multiple instances of the bends 18, 42, 48 and multiple instances of the taper 80 can be arranged in the structure 10 between the different sections of the routing waveguide core 12. For example, two (2) to twelve (12) instances of the bends 18, 42, 48 can be cascaded. The waveguide core region 12, which is illustrated in FIG. 8, may include a straight section 90 connecting the instances of the bends 18 at the middle of the structure 10. Although not shown in FIG. 8, the instances of the bends 42 of the waveguide core region 30 and the instances of the bends 48 of the waveguide core region 32 may have a similar arrangement to the bends 18 so as to be substantially concentric with the bends 18 at all local curvature points, and the bends 42 and the bends 48 may each be connected by straight sections similar to straight section 90. As shown in FIG. 7, the waveguide core regions 30, 32 diverge laterally away from the tapers 80 at the opposite ends of the structure 10.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a waveguiding structure including a first waveguide core region including a first plurality of bends, a second waveguide core region including a second plurality of bends laterally spaced from the first plurality of bends by a gap, and a third waveguide core region including a third plurality of bends positioned beneath the gap, the first waveguide core region and the second waveguide core region comprise a first material, and the third waveguide core region comprises a second material that differs in composition from the first material,
wherein the first plurality of bends partially overlap with the third plurality of bends adjacent to the gap over a length of the third waveguide core region, and the second plurality of bends partially overlap with the third plurality of bends adjacent to the gap over the length of the third waveguide core region.

2. The structure of claim 1 wherein the first plurality of bends and the second plurality of bends each include a first section having a first shape curved as a sector of an annulus and a second section having a second shape curved differently than the first shape.

3. The structure of claim 2 wherein the third plurality of bends each include a third section having a third shape curved as a sector of an annulus and a fourth section having a fourth shape curved differently than the third shape.

4. The structure of claim 2 wherein the first section and the second section of each of the first plurality of bends partially overlaps with the third waveguide core region, and the first section and the second section of each of the second plurality of bends partially overlaps with the third waveguide core region.

5. The structure of claim 1 wherein the third plurality of bends each include a first section having a first shape curved as a sector of an annulus and a second section having a second shape curved differently than the first shape.

6. The structure of claim 5 wherein the gap is centered over the third plurality of bends of the third waveguide core region.

7. The structure of claim 1 wherein the gap is centered over the third waveguide core region.

8. The structure of claim 1 wherein the gap ranges from about 100 nanometers to about 200 nanometers, the first waveguide core region and the second waveguide core region have a width in a range of about 100 nanometers to about 220 nanometers, the third waveguide core region has a width in a range of about 100 nanometers to about 170 nanometers, and the first material has a refractive index in a range of 1.7 to 4.

9. The structure of claim 1 wherein the gap ranges from about 100 nanometers to about 140 nanometers, the first waveguide core region and the second waveguide core region have a width in a range of about 160 nanometers to about 200 nanometers, the third waveguide core region has a width in a range of about 130 nanometers to about 150 nanometers, and the first material has a refractive index in a range of 1.7 to 2.4.

10. The structure of claim 1 further comprising:
a back-end-of-line stack over the waveguiding structure, the back-end-of-line stack including a first dielectric layer and a second dielectric layer, the first dielectric layer comprises a low-k dielectric material having a refractive index between 1.2 and 1.44, and the second dielectric layer comprises a nitrogen-containing blocking dielectric material having a refractive index between 1.7 and 2.8.

11. The structure of claim 1 further comprising:
a first unpatterned dielectric layer and a second unpatterned dielectric layer between the third waveguide core region and the first waveguide core region and the third waveguide core region and the second waveguide core region, the first unpatterned dielectric layer comprised of silicon dioxide, and the second unpatterned dielectric layer comprised of silicon nitride.

12. A method of forming a waveguiding structure, the method comprising:
forming a first waveguide core region including a first plurality of bends;
forming a second waveguide core region including a second plurality of bends that are laterally spaced from the first plurality of bends by a gap; and
forming a third waveguide core region including a third plurality of bends positioned beneath the gap,
wherein the first plurality of bends partially overlap with the third plurality of bends adjacent to the gap over a length of the third waveguide core region, the second plurality of bends partially overlap with the third plurality of bends adjacent to the gap over the length of the third waveguide core region, the first waveguide core region and the second waveguide core region comprise a first material, and the third waveguide core region comprises a second material that differs in composition from the first material.

13. The method of claim 12 wherein the first plurality of bends and the second plurality of bends each include a first section having a first shape curved as a sector of an annulus and a second section having a second shape curved differently than the first shape, the gap is positioned between the first plurality of bends and the second plurality of bends, and the third plurality of bends each include a third section having a third shape curved as a sector of an annulus and a fourth section having a fourth shape curved differently than the third shape.

14. The method of claim 12 wherein the gap is centered over the third waveguide core region.

15. The structure of claim 1 wherein the first plurality of bends and the second plurality of bends are substantially concentric.

16. The structure of claim 15 wherein the first waveguide core region has a first sidewall, the second waveguide core region has a second sidewall positioned adjacent to the first sidewall, and the first sidewall is spaced from the second sidewall by the gap.

17. The structure of claim 16 wherein the gap is centered over the third waveguide core region.

18. The structure of claim 15 wherein the third waveguide core region includes equal portions located beneath the first waveguide core region and the second waveguide core region.

19. The structure of claim 15 wherein the first plurality of bends, the second plurality of bends, and the third plurality of bends have substantially equal curvatures, and the first plurality of bends, the second plurality of bends, and the third plurality of bends are substantially concentric.

20. The structure of claim 1 wherein the first waveguide core region and the second waveguide core region comprise silicon nitride, and the third waveguide core region comprises single-crystal silicon.

* * * * *